(12) United States Patent
Han et al.

(10) Patent No.: US 11,178,524 B2
(45) Date of Patent: Nov. 16, 2021

(54) DATA COLLECTION METHOD USING USER TERMINAL AND DATA COLLECTION SYSTEM

(71) Applicant: ELECTRONICS AND TELECOMMUNICATIONS RESEARCH INSTITUTE, Daejeon (KR)

(72) Inventors: Jinsoo Han, Daejeon (KR); Wan Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 145 days.

(21) Appl. No.: 16/541,219

(22) Filed: Aug. 15, 2019

(65) Prior Publication Data

US 2020/0245108 A1   Jul. 30, 2020

(30) Foreign Application Priority Data

Jan. 29, 2019   (KR) ........................ 10-2019-0011037

(51) Int. Cl.
*H04W 4/38* (2018.01)
*H04L 29/08* (2006.01)
*H04W 64/00* (2009.01)
*H04W 4/021* (2018.01)

(52) U.S. Cl.
CPC ............... *H04W 4/38* (2018.02); *H04L 67/12* (2013.01); *H04W 4/021* (2013.01); *H04W 64/003* (2013.01)

(58) Field of Classification Search
CPC ..... H04W 4/38; H04W 64/003; H04W 4/021; H04L 67/12
USPC ...................................................... 455/456.1
See application file for complete search history.

(56) References Cited

U.S. PATENT DOCUMENTS

| | | | |
|---|---|---|---|
| 9,258,722 B2* | 2/2016 | Schmidt | H04W 84/18 |
| 2009/0061772 A1 | 3/2009 | Moon et al. | |
| 2015/0120867 A1 | 4/2015 | Jung et al. | |
| 2019/0082291 A1* | 3/2019 | Yoon | G01S 1/68 |
| 2019/0156600 A1* | 5/2019 | Potyrailo | B61C 17/08 |
| 2019/0378391 A1* | 12/2019 | Miniard | G06Q 10/10 |

FOREIGN PATENT DOCUMENTS

| | | |
|---|---|---|
| KR | 1020090014029 A | 2/2009 |
| KR | 10-2011-0070049 A | 6/2011 |
| KR | 10-1471561 B1 | 12/2014 |
| KR | 10-2015-0082389 A | 7/2015 |
| KR | 101663658 B1 | 10/2016 |
| KR | 10-2017-0019828 A | 2/2017 |
| KR | 10-2017-0061792 A | 6/2017 |
| KR | 10-2017-0093671 A | 8/2017 |
| KR | 10-2018-0065057 A | 6/2018 |
| KR | 10-1893737 B1 | 10/2018 |

* cited by examiner

*Primary Examiner* — Congvan Tran
(74) *Attorney, Agent, or Firm* — LRK Patent Law Firm

(57) ABSTRACT

A data collection method using a user terminal and a data collection system. The data collection method is a method of collecting data using a user terminal and an existing mobile communication network, without using a separate dedicated communication network.

16 Claims, 14 Drawing Sheets

User terminal 101    Server 103

400

DATA COLLECTION METHOD USING USER TERMINAL AND DATA COLLECTION SYSTEM

CROSS-REFERENCE TO RELATED APPLICATION(S)

This application claims the benefit of Korean Patent Application No. 10-2019-0011037, filed on Jan. 29, 2019, in the Korean Intellectual Property Office, the disclosure of which is incorporated herein by reference.

BACKGROUND

1. Field of the Invention

One or more example embodiments relate to a data collection method using a user terminal and a data collection system and, more particularly, to a method of collecting data from a plurality of sensors installed at many locations and transmitting the collected data to a server.

2. Description of Related Art

A data collector collects data from sensors installed at locations to collect a variety of information related to an external environment. In this example, the data collector interoperates with the sensors to collect the data through wired communication or wireless communication.

If wired communication is used, the sensors and the data collector are connected through a wired communication line such as Ethernet, power-line communication (PLC), RS-485, or RS-232 such that the data collector collects the data from the sensors.

If wireless communication is used, the sensors and the data collector are connected through a wireless communication line such as Wi-Fi, Bluetooth, Zigbee, or LoRa such that the data collector collects the data from the sensors. The wired/wireless communication may also include various schemes other than those mentioned above.

SUMMARY

To solve the disadvantage of the existing technology requiring a separate dedicated communication network, an aspect provides a method of collecting data using a user terminal and an existing mobile communication network, without using a separate dedicated communication network requiring installation and maintenance.

According to an aspect, there is provided a data collection method performed by a user terminal, the data collection method including generating an entry event indicating an entry into a valid region of a sensor by detecting a signal broadcast from the sensor, collecting data from the sensor in response to the entry event, and generating an exit event indicating an exit from the valid region of the sensor corresponding to the entry event, when a broadcast signal is not detected for a predetermined time.

The generating of the entry event may include generating the entry event to run a predetermined application configured to collect data of all sensors corresponding to a region of the sensor when entering the valid region of the sensor, among all applications installed on the user terminal.

The collecting may include extracting at least one sensor corresponding to a data field set as a monitoring region of the user terminal based on a sensor scanning list of the user terminal, and collecting data from the extracted at least one sensor.

The monitoring region of the user terminal may include a plurality of sections divided by predetermined ranges from a position of the user terminal, wherein each of the plurality of sections may be a section in which a sensor configured to measure at least one of environmental information, traffic information, human body information, or energy information is disposed to identify data collectable from the corresponding sensor.

The collecting may include collecting the data from the sensor by setting an alternating region for a sensor disposed in a monitoring region of the user terminal based on a position of the user terminal.

The alternating region may be a region in which a single sensor in a monitoring region list of the user terminal transmits data to the user terminal through a plurality of regions.

The collecting may include continuously collecting data from a single sensor corresponding to a plurality of regions in the monitoring region of the user terminal, while repeating the entry event and the exit event.

The sensor may be configured to measure environmental information, traffic information, human body information, or energy information at predetermined intervals and broadcast corresponding data to the user terminal for a predetermined period.

The data collection method may further include transmitting, by the user terminal, a confirmation request signal of the data to the sensor such that the sensor may check a redundancy of the data, after the data are collected.

The sensor may be configured to check the redundancy of the data transmitted to the user terminal using the confirmation request signal received from the user terminal based on unique identification information registered in advance between the user terminal and the sensor.

According to another aspect, there is provided a data collection method performed by a sensor, the data collection method including measuring environmental information, traffic information, human body information, or energy information at predetermined intervals, broadcasting data to a user terminal present in a valid region of the sensor for a predetermined period, and checking a redundancy of the broadcast data using a confirmation request signal received from the user terminal.

The broadcasting may include verifying whether there are data yet to be transferred to the user terminal present in a valid region of a sensor corresponding to a travel route of the user terminal and transmitting a result of the verifying to the user terminal through a predetermined bit of data.

The broadcasting may include transmitting, by the sensor, whether there are data yet to be transferred to the user terminal using a payload of a confirmation response signal, in response to the confirmation request signal received from the user terminal.

The checking may include checking the redundancy of the data using a number of confirmation request signals received from the user terminal based on unique identification information registered in advance between the user terminal and the sensor.

According to still another aspect, there is provided a user terminal including a processor, wherein the processor may be configured to generate an entry event indicating an entry into a valid region of a sensor by detecting a signal broadcast from the sensor, collect data from the sensor in response to the entry event, and generate an exit event indicating an exit from the valid region of the sensor corresponding to the entry event, when a broadcast signal is not detected for a predetermined time.

The processor may be configured to generate the entry event to run a predetermined application configured to collect data of the sensor corresponding to the valid region, among all applications installed on the user terminal.

The processor may be configured to extract at least one sensor corresponding to a data field set as a monitoring region of the user terminal based on a sensor scanning list of the user terminal, and collect data from the extracted at least one sensor.

The processor may be configured to collect the data from the sensor by setting an alternating region for a sensor disposed in a monitoring region of the user terminal based on a position of the user terminal.

The processor may be configured to continuously collect data from a single sensor having an alternating region in the monitoring region of the user terminal, while repeating the entry event and the exit event.

The processor may be configured to transmit a confirmation request signal of the data to the sensor from which the data is received, such that the sensor may check a redundancy of the data, after the data are collected.

Additional aspects of example embodiments will be set forth in part in the description which follows and, in part, will be apparent from the description, or may be learned by practice of the disclosure.

Advantageous Effects

According to example embodiments, a data collection method may collect data from multiple sensors using a user terminal and transmit the collected data to a server, thereby collecting data using a user terminal at any location where a user passes by, without establishing a separate dedicated communication network.

According to example embodiments, a data collection method may wake up a monitoring app of a user terminal to collect data only when a presence of a sensor is detected, such that the user terminal may collect data of an adjacent sensor while consuming less power.

According to example embodiments, a data collection method may set an alternating region for a sensor to generate an entry/exit event even when a user terminal stays at one location for a long time, such that the user terminal may continuously collect data from an adjacent sensor.

According to example embodiments, in a data missing situation occurring when a user terminal does not pass near a sensor, a data collection method may collect data by suggesting a method of transferring missing data to the user terminal passing near the sensor in a different time slot although there would be a time delay.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
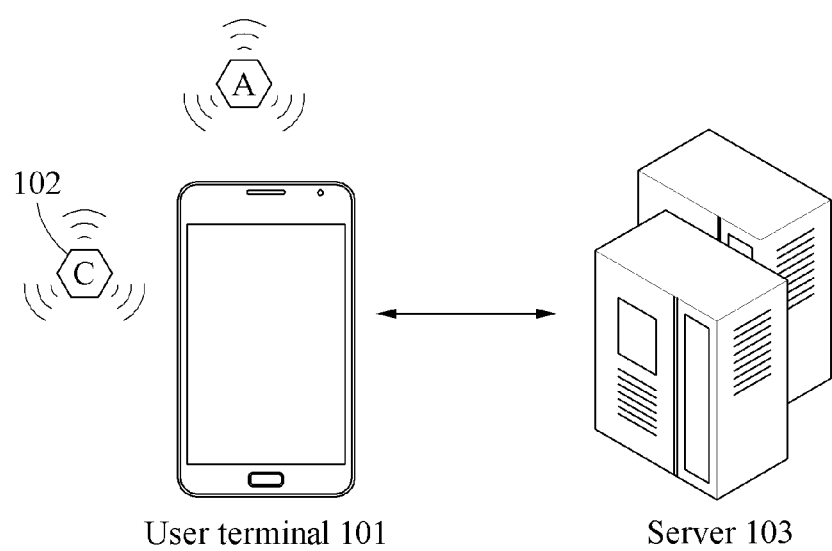
FIG. 1 is a diagram illustrating an operation of a user terminal interoperating with a server and a sensor according to an example embodiment.

Hereinafter, some example embodiments will be described in detail with reference to the accompanying drawings. Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. When it is determined detailed description related to a related known function or configuration they may make the purpose of the example embodiments unnecessarily ambiguous in describing the example embodiments, the detailed description will be omitted here.

FIG. 1 is a diagram illustrating an operation of a user terminal interoperating with a server and a sensor according to an example embodiment.

Referring to FIG. 1, a data collection system suggested herein may include a sensor 102 including a Bluetooth communication interface, a user terminal 101 configured to collect data from the sensor 102, and a server 103 configured to receive the data from the user terminal 101.

The sensor 102 may transmit measured data to a user terminal entering a valid region of the sensor 102 through broadcasting. The sensor 102 may be connected to a plurality of user terminals through the Bluetooth communication interface to perform two-way communication, as necessary.

The user terminal 101 may include the Bluetooth communication interface. The user terminal 101 may connect to the Internet using Wi-Fi or a mobile communication network. The user terminal 101 may collect data broadcast from the sensor 102. The user terminal 101 may transmit the collected data to the server 103 over the Internet connected through Wi-Fi or the mobile communication network. In this example, the user terminal 101 may continuously scan the sensor 102 to receive the broadcast data through Bluetooth communication. However, in this example, the user terminal 101 may require a great battery consumption, and thus the practicality may decrease.

Thus, the user terminal 101 may need a function to reduce a power consumption required to scan the sensor 102. That is, the user terminal 101 may reduce the battery consumption of the user terminal 101 by applying a scheme of collecting data through efficient use of energy. To achieve the foregoing, the user terminal 101 may collect data from multiple sensors 102 present within a range of Bluetooth communication. The user terminal 101 may collect data measured in real time from the sensors 102 based on a time or a period.

The server 103 may collect the data transmitted from the user terminal 101 and store the collected data in a database. In this example, the server 103 may receive the collected data respectively from multiple user terminals. In general, user terminals 101 are widely used in our daily lives. Thus, the server 103 may collect a lot of various data from a large number of user terminals.

The user terminal 101 may connect to the Internet through the mobile communication network or Wi-Fi and transfer data to the server 103 connecting to the Internet through two-way communication. In doing so, the server 103 may collect data of the sensor 102, without installing a dedicated wired/wireless communication network between the sensor 102 and the server 103. Further, the user terminal 101 is a device that may move when a user moves, rather than being stationary and thus, may collect multiple items of data from sensors installed at many locations.

Figure 2:
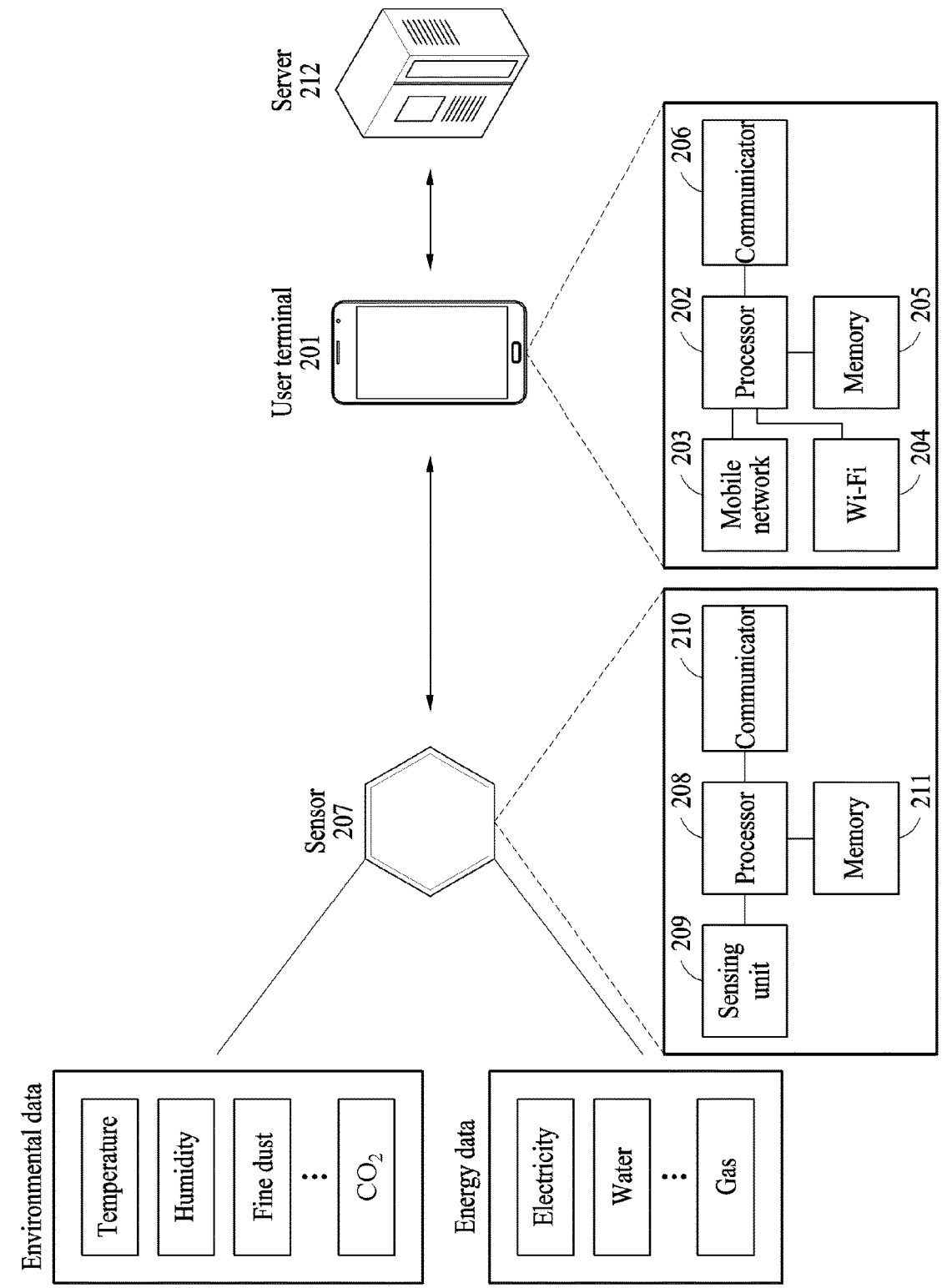
FIG. 2 is a diagram illustrating respective configurations of a sensor and a user terminal according to an example embodiment.

FIG. 2 is a diagram illustrating respective configurations of a sensor and a user terminal according to an example embodiment.

Referring to FIG. 2, a data collection system suggested herein may include a sensor 207 including a Bluetooth communication interface, a user terminal 201 configured to collect data from the sensor 207, and a server 212 configured to receive the data from the user terminal 201.

The sensor 207 may collect all information that may be sensed by a sensor in an external environment. To achieve the foregoing, the sensor 207 may include a processor 208, a sensing unit 209, a communicator 210, and a memory 211. The sensing unit 209 may perform a role to measure a value, energy, or a position from an adjacent external environment. Here, environmental data may be information measurable based on a natural condition, such as temperature, humidity, fine dust, $CO_2$, and CO. Energy data may be information measurable based on a living condition, such as an electricity consumption, a water consumption, and a gas consumption. The sensor 207 may perform a sensing function to measure a position using the global positioning system (GPS).

The processor 208 may perform a central processing function, and the processor 208 and the sensing unit 209 may be connected in an analog or digital manner to transmit and receive measured values. In addition, the processor 208 may store the data measured by the sensing unit 209 in the memory 211, or transfer the measured data to the user terminal 201 through the communicator 210.

The memory 211 may receive the data measured by the sensing unit 209 from the processor 208 and store the received data. Further, the memory 211 may store various values to be used by the processor 208.

The communicator 210 may perform a Bluetooth communication function and transmit the data sensed by the sensing unit 209 or the data stored in the memory 211 to the user terminal 201 through the processor 208. Further, the communicator 210 may perform a communication function to receive data from the user terminal 201 and store the received data in the memory 211 through the processor 208.

The user terminal 201 may include a processor 202, a memory 205, and a communicator 206. The user terminal 201 may connect to the Internet using a mobile network 203 or Wi-Fi 204.

The processor 202 may access the Internet while managing the mobile network 203 or Wi-Fi 204. The processor 202 may store the data collected from the sensor 207 in the memory 205 or retrieve the stored data from the memory 205 for use. The memory 205 may store a variety of data.

The processor 202 may receive data broadcast from a plurality of sensors through the communicator 206. The processor 202 may be connected to the sensor 207 through the communicator 206, as necessary, to perform two-way communication, or receive data through one-way communication without connection.

The communicator 206 may perform a Bluetooth communication function, and perform a role to communicate with the sensor 207. When communicating with the sensor 207, the communicator 206 may transmit and receive data through two-way communication. Further, the communicator 206 may only receive data broadcast by the sensor 207 through one-way communication.

Figure 3:
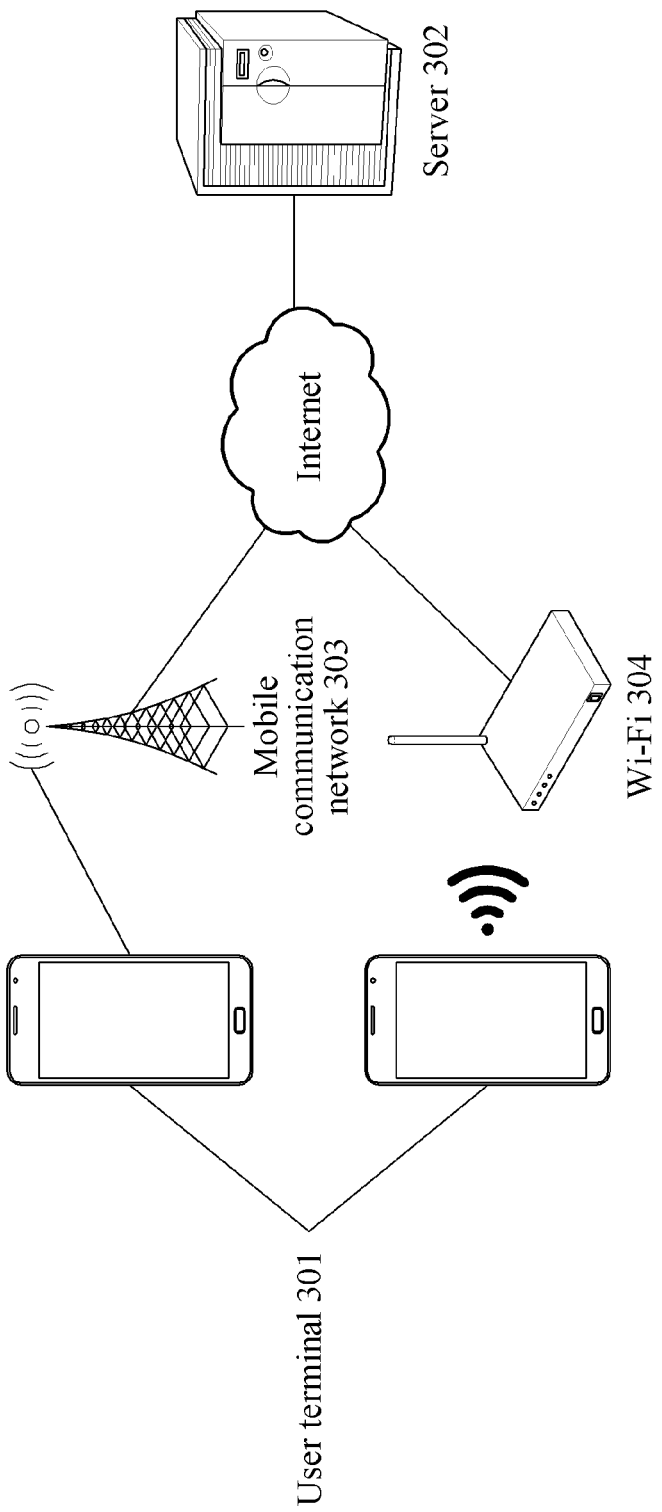
FIG. 3 is a diagram illustrating a process of connecting a user terminal and a server through the Internet according to an example embodiment.

FIG. 3 is a diagram illustrating a process of connecting a user terminal and a server through the Internet according to an example embodiment.

Referring to FIG. 3, a user terminal 301 may be connected to a server 302 through the Internet. In detail, the user terminal 301 may be connected to the server 302 through the Internet via a mobile communication network 303 or Wi-Fi 304. In this example, the user terminal 301 may use the mobile communication network 303 or selectively use Wi-Fi 304, as necessary. The user terminal 301 may transfer data collected from a sensor to the server 302.

Figure 4:
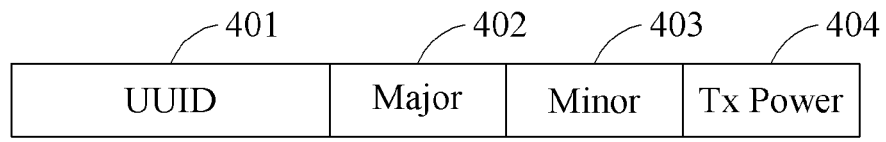
FIG. 4 is a diagram illustrating data fields used in a monitoring region of a user terminal according to an example embodiment.

FIG. 4 is a diagram illustrating data fields transmitted by a sensor to a user terminal according to an example embodiment.

Referring to FIG. 4, a user terminal may include data fields used in a monitoring region of the user terminal. Here, the data fields may be conditions for scanning a sensor which receives data through broadcasting. The data fields may include universally unique identifier (UUID) 401, Major 402, Minor 403, and Tx power 404, which are as follows.

UUID 401 is a general-purpose unique identifier, which is a unique name used to identify and distinguish an entity on a network, the identifier defined and used in domain/OS.

Major 402 refers to a sensor ID to be scanned.

Minor 403 refers to major control data.

Tx power 404 represents power transmitted by a sensor, that is, a beacon.

The user terminal may scan a sensor present in the monitoring region of the user terminal by combining the data fields. That is, the user terminal may set at least one of 1) a UUID 401 region, 2) a UUID 401+Major 402 region, and 3) a UUID 401+Major 402+Minor 403 region.

For example, the user terminal may use UUID 401 as a region, Major 402 as a sensor ID, and the remaining Minor 403+Tx Power 404 region as data. The user terminal may receive data from a Bluetooth signal broadcast by a sensor having a Bluetooth function using the data fields described above.

Figure 5:
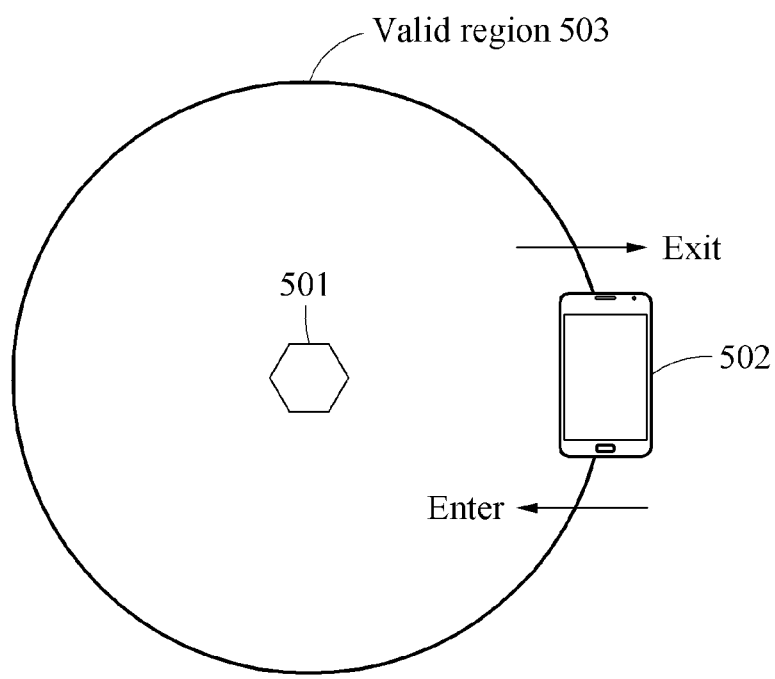
FIG. 5 is a diagram illustrating a process of a user terminal entering or exiting a valid region of a sensor according to an example embodiment.

FIG. 5 is a diagram illustrating a process of a user terminal entering or exiting a valid region of a sensor according to an example embodiment.

Referring to FIG. 5, a user terminal 502 may receive data broadcast from a sensor 501. The sensor 501 may be a beacon including a Bluetooth communication interface. The sensor 501 may be combined with the user terminal 502 to provide a proximity service. The sensor 501 may set a region of the sensor 501 based on the Bluetooth communication interface. A valid region 503 of the sensor 501 may be a communication range. The sensor 501 may periodically broadcast data measured in real time in an external environment.

The user terminal 502 may verify whether the user terminal enters the valid region 503 of the sensor 501 using a region monitoring function. Here, the region monitoring function may be a function to detect a signal such that an operating system (OS) detects a sensor signal to run a predetermined app installed on the user terminal 502 even when the app is not running.

The user terminal 502 may operate even in a state in which a screen of the user terminal 502 is locked through the region monitoring function, thereby efficiently using energy.

When the user terminal 502 enters the valid region 503 of the sensor 501, the user terminal 502 may detect the signal broadcast from the sensor 501, thereby recognizing the entry into the valid region 503 of the sensor 501.

In further detail, when the user terminal 502 enters the valid region 503 of the sensor 501, the operating system of the user terminal 502 may detect the entry and generate an entry event. When the user terminal 502 exits the valid region of the sensor, the operating system of the user terminal 502 may detect the exit and generate an exit event.

The user terminal 502 may scan an adjacent sensor 501 through a ranging function. Here, in a region monitoring function, the operating system of the user terminal 502 may perform a function to detect that the user terminal 502 enters or exits the valid region of the sensor 501. In the ranging function, the app installed on the user terminal 502 may scan all sensors included in a sensor scanning list of the user terminal 502. For example, a region of a sensor may be used as UUID and defined as A. In this example, when the user terminal receives a signal of UUID=A from an adjacent sensor, the operating system may detect the signal corresponding to UUID=A using the region monitoring function and run a related app. In this example, the corresponding app may run to scan all sensors with UUID=A and collect data therefrom.

The user terminal 502 may scan all sensors 501 corresponding to a monitoring region to be found by the app installed on the user terminal 502, and verify data of the scanned sensor 501. In this example, the user terminal 502 may display UUID, Major, Minor, and Tx power of all sensors 501 corresponding to a monitoring region set through the data fields described with reference to FIG. 4.

The user terminal 502 may recognize an entry into a predetermined region through the region monitoring function and collect data broadcast from the sensor 501 through the ranging function.

Figure 6:
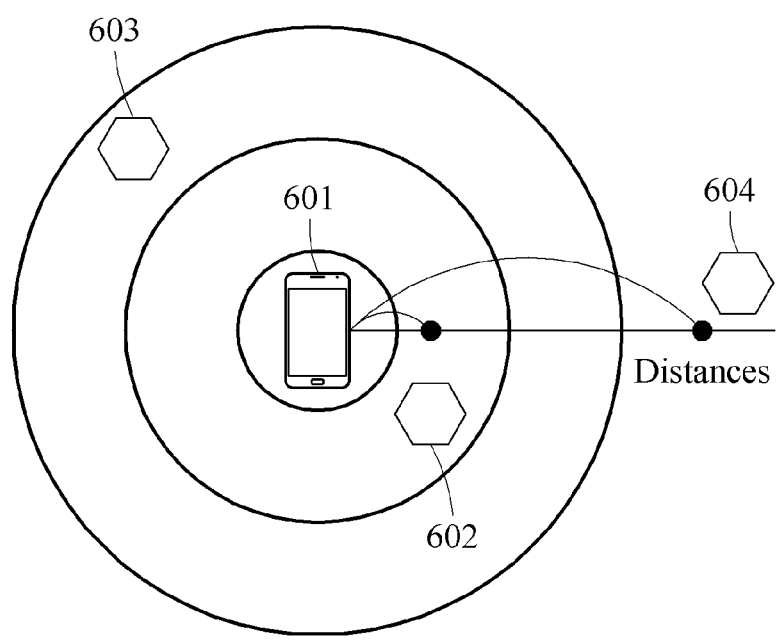
FIG. 6 is a diagram illustrating a process of scanning a sensor corresponding to a data field used in a monitoring region of a user terminal and displaying the scanned sensor on a screen of the user terminal according to an example embodiment.

FIG. 6 is a diagram illustrating a process of scanning a sensor corresponding to a data field used in a monitoring region of a user terminal and displaying the scanned sensor on a screen of the user terminal according to an example embodiment.

Referring to FIG. 6, a user terminal 601 may scan a plurality of sensors 602, 603, and 604 corresponding to a monitoring region set through data fields. The user terminal 601 may display the scanned plurality of sensors 602, 603, and 604 on a screen of the user terminal 601.

In further detail, the user terminal 601 may collect data using a region monitoring function and a ranging function. Here, the user terminal 601 may collect data using an app installed on the user terminal 601. The user terminal 601 may collect data from the plurality of sensors 602, 603, and 604 appropriately using UUID, Major, minor, and Tx power of the data fields depending on a need of the app.

For example, a sensor may use UUID as a region representation, Major as a sensor ID, and Minor and Tx power as data. The user terminal 601 may set UUID as a region and detect whether an entry into or an exit from a valid region of the sensor occurs in the region monitoring function. When an entry is detected, the user terminal 601 may generate an entry event and run the app installed on the user terminal 601 based on the entry event. The app installed on the user terminal 601 may collect data from an adjacent sensor corresponding to the monitoring region of the user terminal through a ranging function.

Even when the screen of the user terminal 601 is locked, the user terminal 601 suggested herein may generate an event when entering or exiting the valid region of the sensor by performing the region monitoring function through an operating system. When the user terminal enters the valid region of the sensor, the operating system of the user terminal 601 may generate an entry event indicating an entry into the valid region of the sensor, and run an app to collect data from a sensor connected to the valid region of the sensor.

The app may run through the entry event generated by the operating system of the user terminal, and scan and record all sensors corresponding to the monitoring region of the user terminal. In this example, the user terminal may verify data and ID of each sensor from broadcast data.

Figure 7:
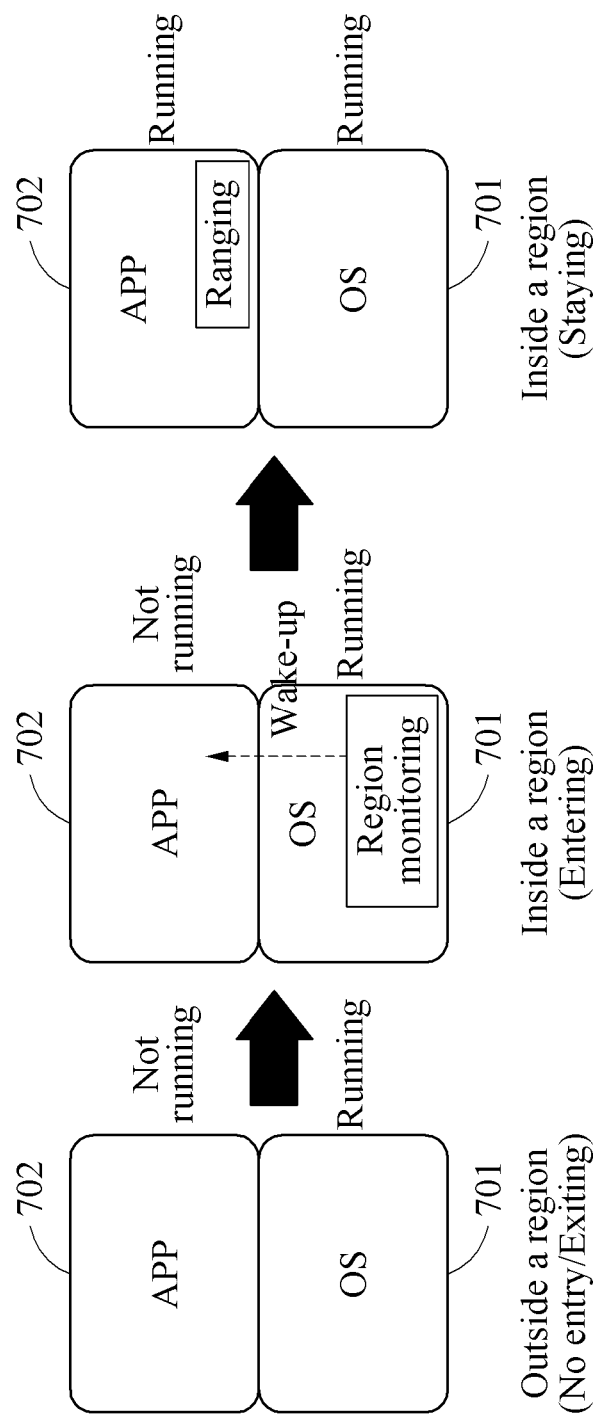
FIGS. 7A through 7C are diagrams illustrating a process of a user terminal collecting data according to an example embodiment.

FIGS. 7A through 7C are diagrams illustrating a process of a user terminal collecting data according to an example embodiment.

Referring to FIGS. 7A through 7C, a user terminal may collect data considering when the user terminal is outside a valid region of a sensor and when the user terminal is inside the valid region.

In FIG. 7A, the user terminal may not generate an entry event or an exit event to collect data from the sensor or suspend the data collection when the user terminal is outside the valid region of the sensor. In this example, if a screen of the user terminal is being locked, the user terminal may operate in a power saving mode in a state in which only an operating system 701 of the user terminal is operating.

In FIG. 7B, when the user terminal enters the valid region of the sensor, the operating system 701 of the user terminal may control a registered app 702 corresponding to the valid region of the sensor to wake up and run while generating an entry event.

In FIG. 7C, the running app 702 may scan adjacent sensors using a ranging function and collect data of a sensor indicating the valid region of the sensor. The user terminal may collect data by running an app configured to collect data only when a valid sensor is near the user terminal, thereby efficiently using battery power of the user terminal.

Figure 8:
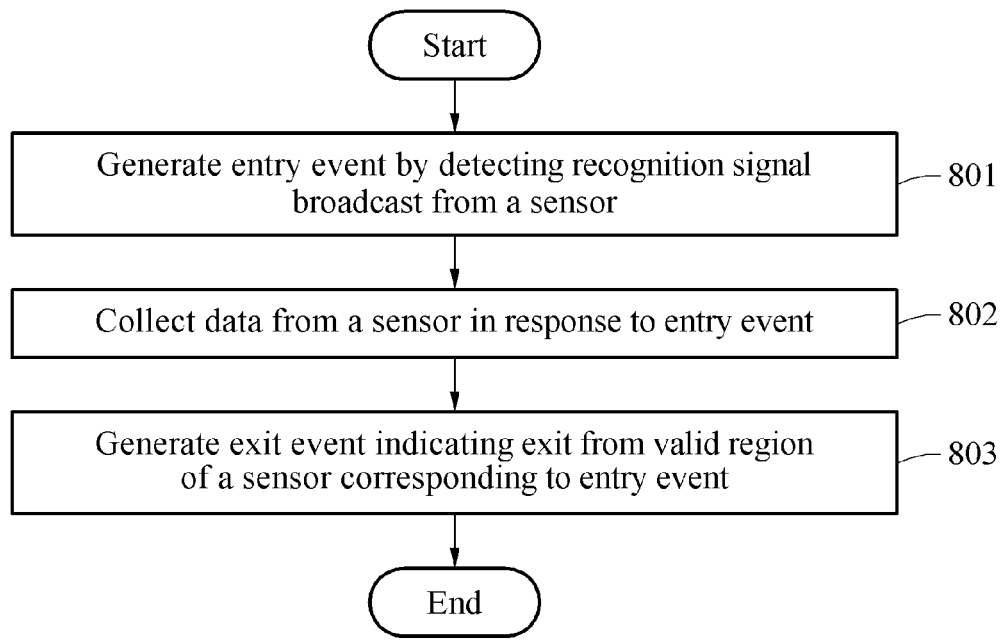
FIG. 8 is a flowchart illustrating a data collection method of a user terminal according to an example embodiment.

FIG. 8 is a flowchart illustrating a data collection method of a user terminal according to an example embodiment.

In operation 801, a user terminal may detect a signal broadcast from a sensor and generate an entry event indicating an entry into a valid region of the sensor. Here, the user terminal may generate an entry event to run a predetermined application configured to collect data of the sensor corresponding to the valid region, among all applications installed on the user terminal.

In operation 802, the user terminal may collect data from the sensor in response to the entry event. In detail, the user terminal may extract at least one sensor corresponding to a data field set as a monitoring region of the user terminal based on a sensor scanning list of the user terminal. In addition, the user terminal may collect data from the extracted at least one sensor.

Here, the monitoring region of the user terminal may include a plurality of sections divided by predetermined ranges from a position of the user terminal. Each of the plurality of sections may be a section in which a sensor configured to measure at least one of environmental information, traffic information, human body information, or energy information is disposed to identify data collectable from the corresponding sensor.

Further, the user terminal may collect the data from the sensor by setting an alternating region for the plurality of sensors in a monitoring region of the user terminal based on a position of the user terminal. The alternating region may be a region in which a single sensor in the monitoring region of the user terminal transmits data to the user terminal through a plurality of regions.

The user terminal may continuously collect data from a single sensor corresponding to a plurality of regions in the monitoring region of the user terminal, while repeating the entry event and the exit event.

The user terminal may further include an operation of transmitting a confirmation request signal SCAN_REQ of the data to the sensor such that the sensor may check a redundancy of the data, after the data are collected.

In operation 803, the user terminal may generate an exit event indicating an exit from the valid region of the sensor corresponding to the entry event, when a signal is not detected for a predetermined time.

Figure 9:
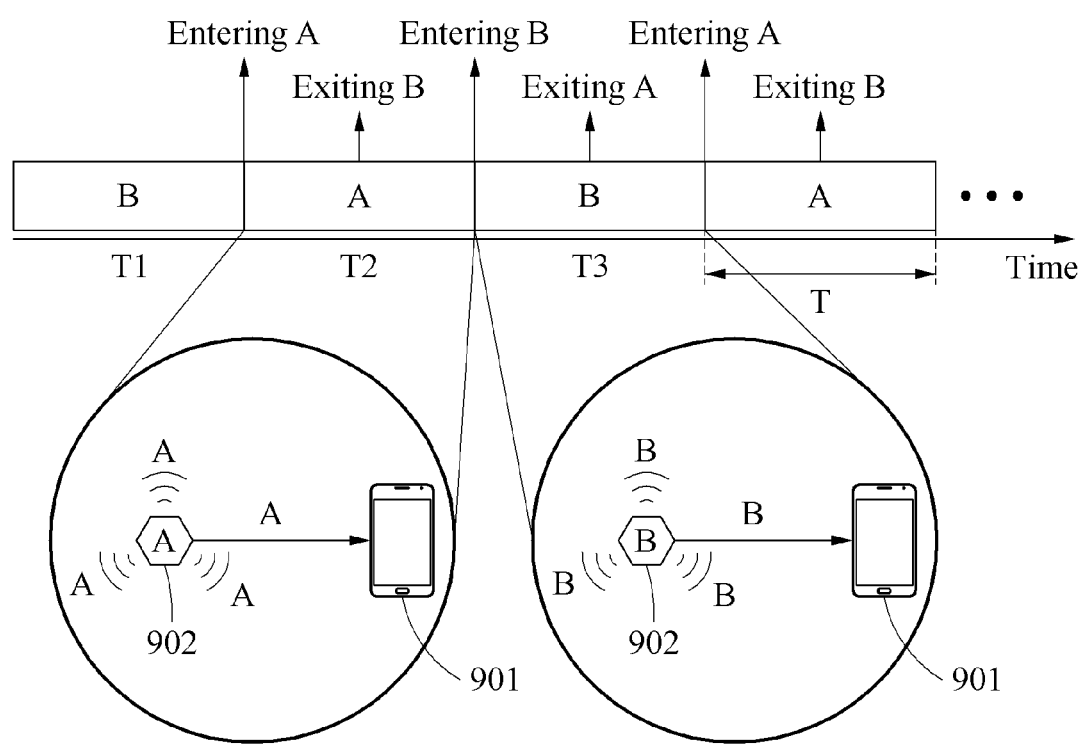
FIG. 9 is a diagram illustrating a process of a sensor transmitting data measured in real time using an alternating region through broadcasting according to an example embodiment.

FIG. 9 is a diagram illustrating a process of a sensor transmitting data measured in real time using an alternating region through broadcasting according to an example embodiment.

Referring to FIG. 9, a sensor 902 may broadcast data measured based on an external environment using a plurality of regions over time, thereby transmitting the data to a user terminal 901. For example, the sensor 902 may broadcast the data repeatedly in every time slot, and transmit the data to the user terminal 901 using A in a first time slot and using B in a second time slot.

A single item of data measured may be transmitted to multiple user terminals. That is, the sensor 902 uses broadcasting such that the single item of data may be transferred to a server through the multiple user terminals. Through such a cooperation of the multiple user terminals, a probability the data are collected may increase. Further, a single user terminal may collect data from multiple adjacent sensors.

As shown in FIG. 9, the sensor 902 may broadcast the data using the valid region B in a time section T1, and broadcast the data by switching to the valid region A in a time section T2. In this example, the user terminal 901 may generate an entry event indicating an entry into the valid region A of the sensor 902. Since then, the user terminal 901 may collect the data from the sensor using a ranging function. In this example, the user terminal may generate an exit event indicating an exit from the valid region B of the sensor 902 when a signal broadcast from the sensor 902 using the valid region B is not received for a predetermined time.

After that, the sensor 902 may broadcast the data using the valid region A in the time section T2, and broadcast the data using the valid region B in a time section T3. In this example, the user terminal 901 staying at one location may meet the requirements for generating an entry event with respect to the valid region B of the sensor 902, in view of a history of having the exit event with respect to the valid region B of the sensor 901 in the past.

Thus, when the user terminal 901 enters the valid region B of the sensor 902 from the valid region A of the sensor 902 at the beginning of the time section T3, the user terminal 901 may generate an entry event with respect to the valid region B of the sensor 902 and collect the data again from an adjacent sensor based on the entry event with respect to the valid region B of the sensor 902.

That is, the user terminal 901 may generate an entry-exit event with respect to a valid region of the sensor 902, using an entry event and an exit event of the sensor in pair. In this example, when an exit event is not generated after an entry event indicating an entry into a valid region of a sensor is generated, the user terminal 901 may not collect data within the valid region of the sensor where the entry event is generated. That is, the entry event may be an event that the user terminal 901 may collect data of the sensor when the user terminal 901 enters the valid region of the sensor, and the exit event may be an event that the user terminal terminates collecting the data of the sensor and collects the data again when entering the valid region of the corresponding sensor again.

The user terminal 901 may generate an exit event with respect to the valid region A of the sensor 902 when a signal is not collected in the valid region A of the sensor 902 for a predetermined time. The generated exit event with respect to the valid region A of the sensor 902 may form a precondition for generating an entry event again in the valid region A of the sensor 902 when the broadcast signal is transmitted again using the valid region A of the subsequent sensor 902.

If the user terminal continuously stays in a predetermined region, an exit event is not generated. Thus, the user terminal may not collect data from an adjacent sensor even when the user terminal stays within a valid range of the sensor. To solve such an issue, there is a need for a method of collecting data from a sensor by generating an entry/exit event even when the user terminal continuously stays in a predetermined region.

To achieve the foregoing, the user terminal may use an alternating region as described above. That is, a sensor may have two regions and perform broadcasting by alternating the regions periodically. In this example, even when the user terminal continuously stays near the sensor, a region may change periodically in a packet broadcast by the sensor. Thus, the user terminal may have an effect of entering/exiting the two regions.

When the sensor alternately uses the valid regions periodically, the user terminal suggested herein may have an effect of an entry/exit event even when the user terminal stays geographically at one location and thus, may continuously collect data from the sensor.

Figure 10:
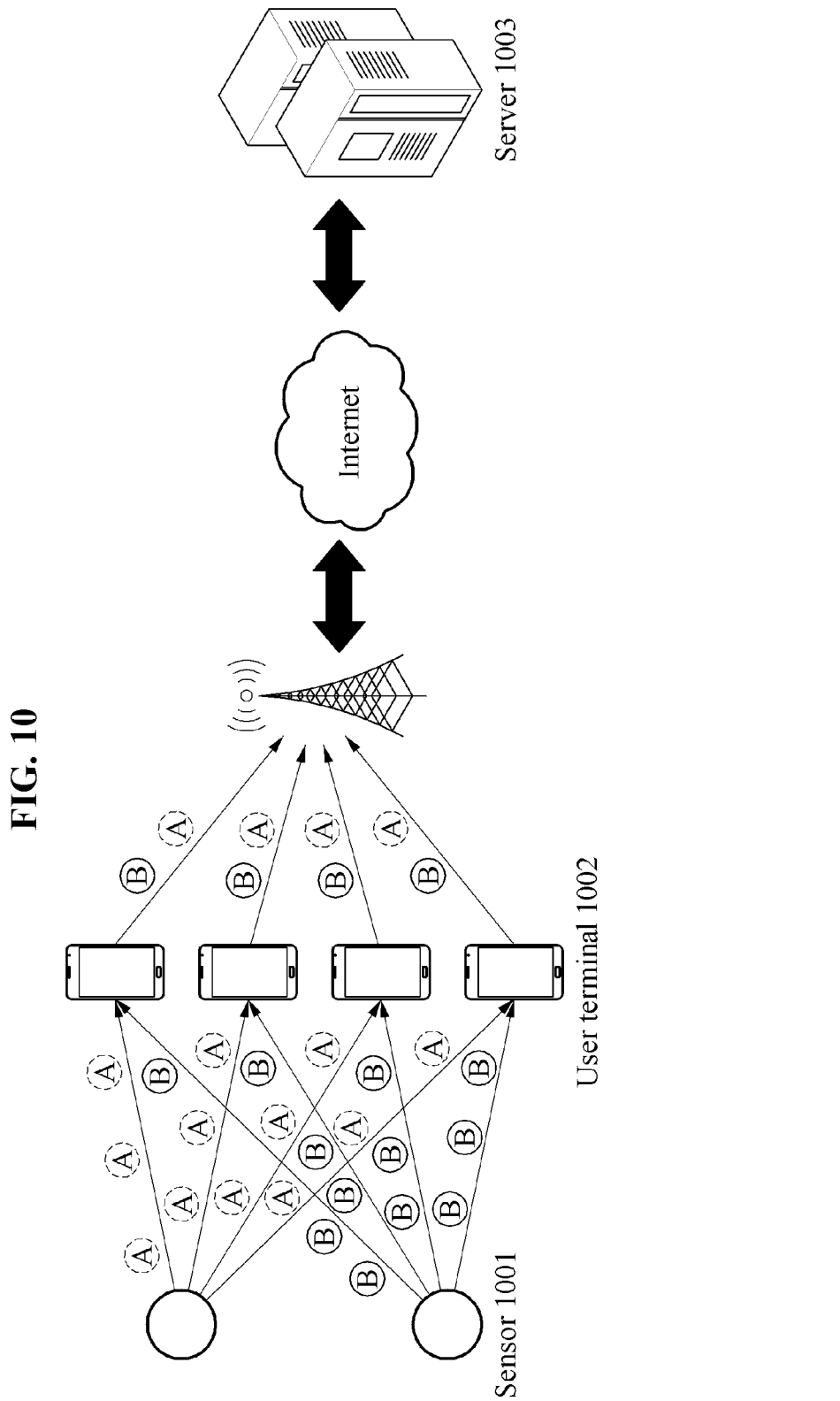
FIG. 10 is a diagram illustrating a process of a user terminal minimizing a redundancy of collected data according to an example embodiment.

FIG. 10 is a diagram illustrating a process of a user terminal minimizing a redundancy of collected data according to an example embodiment.

Referring to FIG. 10, a sensor 1001 may broadcast data measured in real time. In this example, the data broadcast from the sensor 1001 may continuously represent different values based on information actually measured. On the other hand, the sensor 1001 may broadcast data measured at predetermined intervals.

In this example, the data broadcast from the sensor 1001 may be the same data during a corresponding period. That is, the sensor may periodically broadcast the same data for a predetermined time. For example, the sensor may measure data such as temperature, humidity, and fine dust at intervals of 1 hour or 15 minutes and transmit the data for a predetermined period.

In many cases, the sensor 1001 may transmit data measured at predetermined intervals, rather than measuring and transmitting real-time data at extremely short intervals as in common cases. For example, the sensor 1001 may measure data at intervals of 1 hour and continuously broadcast the measured data for an hour, thereby transmitting the data to an adjacent user terminal 1002 passing near the sensor. The user terminal 1002 may transfer the data collected from the sensor to a server 1003.

Here, since the same data are continuously broadcast for an hour, the sensor 1001 may transmit the data to multiple user terminals. That is, the sensor 1001 may need to transfer the data to unspecified multiple user terminals and thus, need to increase a probability the data are transferred by transmitting the same data a number of times. In this example, the user terminal may receive the same data multiple times over time when receiving data from the sensor while passing by a location at which the sensor is present.

Further, the multiple user terminals may continuously collect data from a plurality of sensors, and transmit the data collected from the plurality of sensors to the server. In this example, the data transmitted to the server include duplicate data, and thus excessive data traffic may occur. Similarly, when a measuring interval is 15 minutes, data redundancy may occur, which may thus cause a lot of traffic.

Thus, the user terminal suggested herein may reduce the redundancy of data transmitted to the server through the following method. In detail, an app configured to directly collect data may recognize that the corresponding data are duplicate data, whereby the user terminal may perform internal filtering. Through this, the user terminal suggested herein may not transmit the duplicate data any further, thereby preventing the duplicate data from being transmitted to the server.

When the user terminal operates similarly, multiple user terminals may transmit the same data to the server such that the server may receive duplicate data. However, it is possible to prevent a user terminal from repetitively transmitting the same data.

Figure 11:
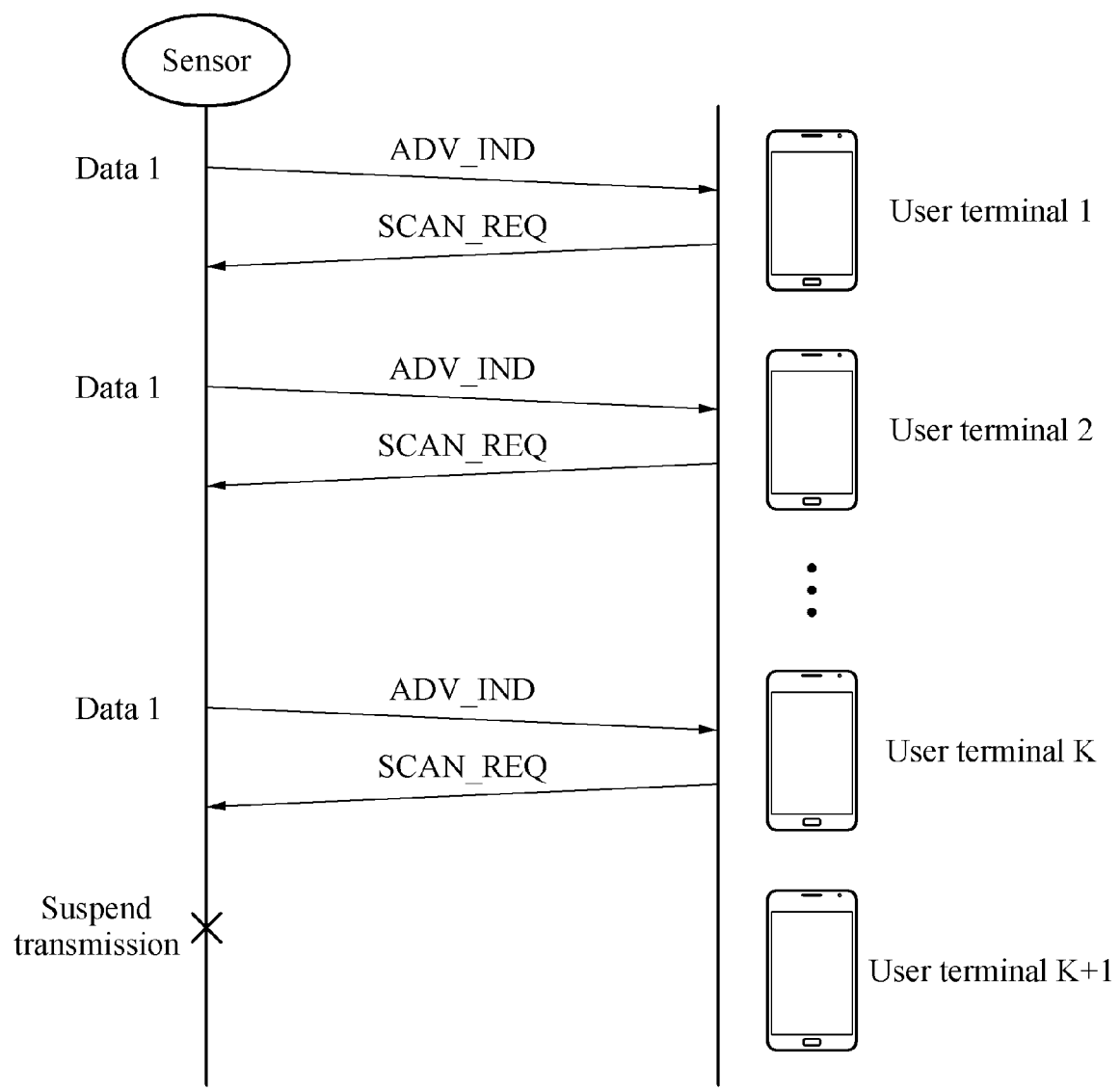
FIG. 11 is a diagram illustrating a process of minimizing a redundancy of data through messages transmitted and received between a sensor and user terminals according to an example embodiment.

FIG. 11 is a diagram illustrating a process of minimizing a redundancy of data through messages transmitted and received between a sensor and user terminals according to an example embodiment.

Referring to FIG. 11, a user terminal may minimize a redundancy of data based on messages transmitted to and received from a sensor, using message transmission. In detail, the sensor may broadcast measured data through ADV_IND or ADV_NONCONN_IND using Bluetooth low energy (BLE).

In a connectionless state, the sensor and the user terminal may transmit and receive messages using a function of BLE. In the corresponding function, when the sensor transmits sensed data to the user terminal in a type of ADV_IND or ADV_NONCONN_IND, the user terminal may inform that the user terminal receives the corresponding data by transmitting a confirmation request signal SCAN_REQ corresponding to the ADV_IND or ADV_NONCONN_IND-type data transmitted from the sensor. In the corresponding function, even when the sensor and the user terminal are not connected, the user terminal may receive additional data from the sensor.

When the user terminal receives data periodically broadcast by the sensor, the user terminal may inform the sensor that the user terminal receives the broadcast data by transmitting the confirmation request signal SCAN_REQ to the sensor, without setting a connection with the sensor. In this example, the sensor may receive confirmation request signals SCAN_REQ from a number of user terminals and verify that the data transmitted by the sensor are transferred to the multiple user terminals.

When the number of received confirmation request signals SCAN_REQ is greater than or equal to a predetermined number, the sensor may determine that the data being currently transmitted are sufficiently transferred and suspend data broadcasting. In this manner, data redundancy may be reduced using the function supported by BLE.

Figure 12:
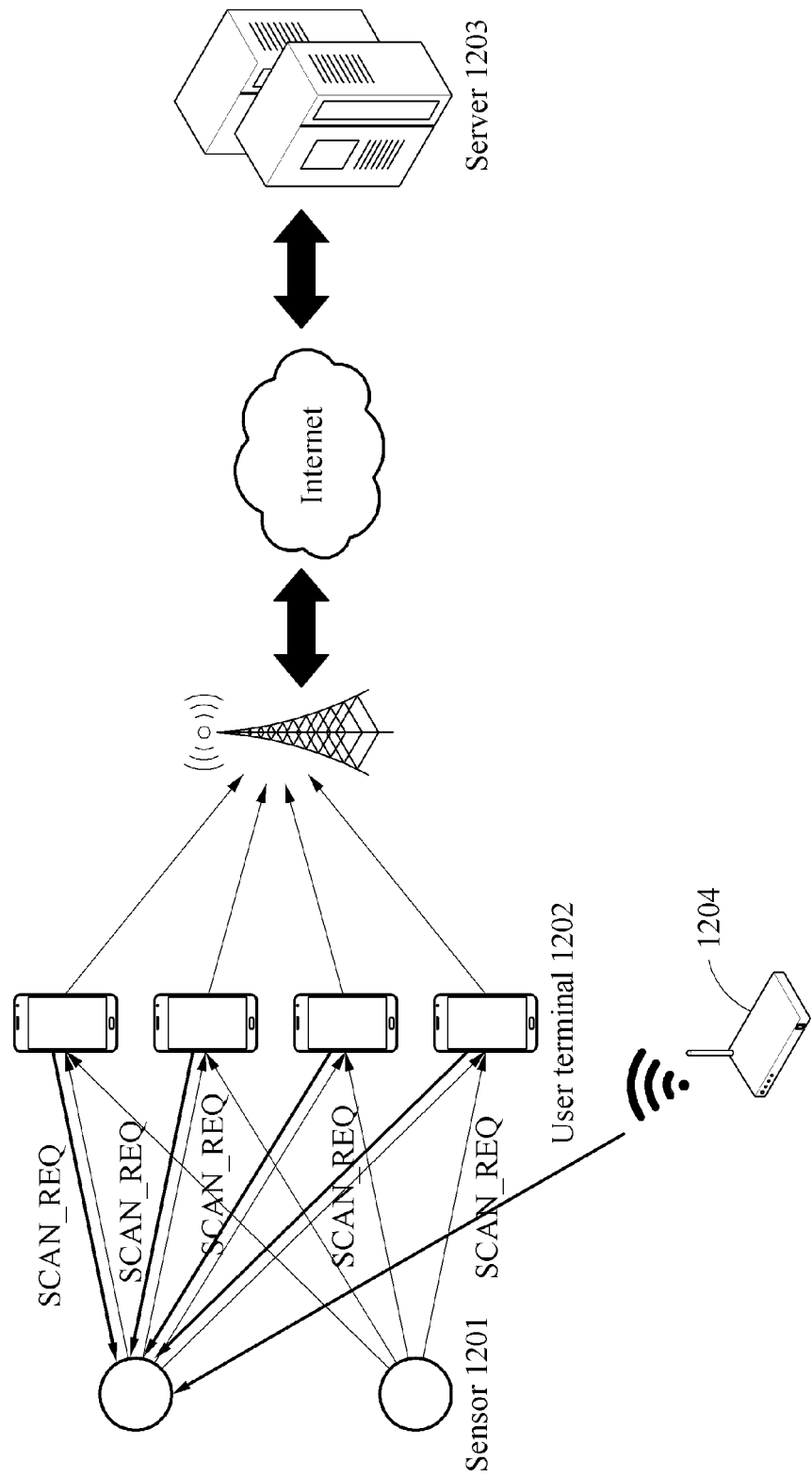
FIG. 12 is a diagram illustrating a process of a hacker interrupting data broadcast from a sensor according to an example embodiment.

FIG. 12 is a diagram illustrating a process of a hacker interrupting data broadcast from a sensor according to an example embodiment.

Referring to FIG. 12, a hacker 1204 may interrupt a broadcasting process of a sensor 1201 by transmitting a predetermined confirmation request signal SCAN_REQ to the sensor. The scheme described through FIG. 11 may be interrupted by the hacker 1204. That is, the hacker 1204 may transmit the confirmation request signal SCAN_REQ to the sensor 1201 a number of times while changing an ID based on a broadcast signal transmitted by the sensor 1201. In this example, the sensor 1201 may recognize that multiple user terminals 1202 receive the data and suspend data transmission to the user terminals 1202.

To prevent such a situation, unique information may need to be shared between the sensor 1201 and the user terminals 1202 or an app installed on the user terminals 1202 for blocking an attack from the hacker. The attack from the hacker may be blocked through the following process.

① A user terminal 1202 may create a list of sensors 1201 from which data are received through broadcasting. Further, the sensor 1201 may create a list of user terminals 1202 to which data are transmitted through broadcasting.

② When data are received from at least one sensor, the user terminal 1202 may verify whether an ID of the sensor 1201 transmitting the data is in the list.

③ When the ID of the sensor 1201 is not in the list, the user terminal 1202 may attempt to connect to the sensor 1201 by transmitting a connection request to the sensor 1201, and form a connection state with the sensor 1201.

④ The formed connection state may undergo a security process set in advance, whereby a connection to a user terminal unrelated to the present purpose is prevented. Here, the security process may use an encryption key set therebetween. Further, it may also be used as a security method between various devices. In such a connection state, their IDs may be exchanged therebetween, whereby an attack from a hacker may be blocked. The sensor 1201 may store the ID of the user terminal 1202, and the user terminal 1202 may store the ID of the sensor 1201, whereby data may be transmitted between the authenticated devices.

⑤ The connection may be terminated.

⑥ When the hacker 1204 transmits an invalid confirmation request signal SCAN_REQ, the sensor 1201 may verify whether an ID of a device transmitting the corresponding confirmation request signal SCAN_REQ is in the list, and determine that the confirmation request signal SCAN_REQ is an unverified confirmation request signal SCAN_REQ and ignore the signal if the ID is not in the list.

Figure 13:
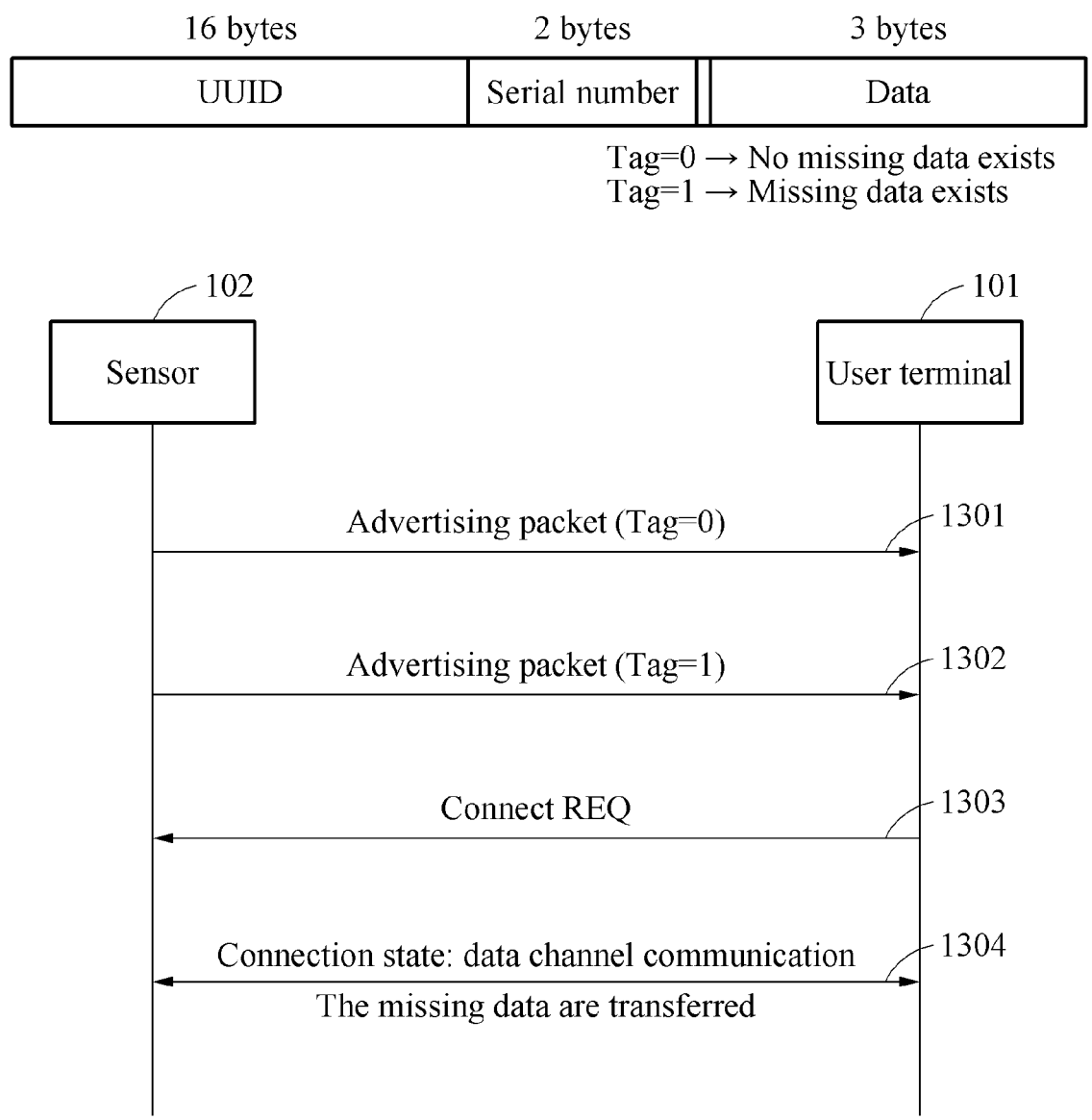
FIG. 13 is a flowchart illustrating a process of providing a user terminal with information regarding whether there are missing data using a predetermined bit of data according to an example embodiment.

FIG. 13 is a flowchart illustrating a process of providing a user terminal with information regarding whether there are missing data using a predetermined bit of data according to an example embodiment.

The method suggested herein may be affected by collection of data depending on whether there is a user terminal passing near a sensor. That is, when a user terminal does not pass near the sensor in a predetermined time slot, surrounding data may not be collected in the time slot. In this example, there is a need for a method in which a user terminal passing by in a different time slot collects missing data and transmits the data to the server even when a time delay occurs.

Referring to FIG. 13, the sensor may provide the user terminal with information regarding whether there are missing data using a predetermined bit of data. Here, while the sensor and the user terminal (or an app of the user terminal) share unique information according to the configuration described through FIG. 12, whether there are missing data may be provided.

To achieve the foregoing, the sensor may indicate that there are data yet to be transmitted by the sensor using a predetermined bit in a signal being broadcast, and transmit the broadcast signal to the user terminal. Referring to the description of FIG. 12, the user terminal may transmit a confirmation request signal SCAN_REQ to the sensor, and the sensor may receive the confirmation request signal SCAN_REQ from the user terminal and inform the user terminal that the confirmation request signal SCAN_REQ is received using a confirmation response signal SCAN_RSP.

Thus, the sensor may verify whether predetermined data are transferred or not transferred to the user terminal, based on whether the sensor replies to the confirmation request signal SCAN_REQ received from the user terminal. Thus, the sensor may inform the user terminal that there are missing data using a predetermined bit of data. The detailed process may be performed as follows.

In operation 1301, a sensor may transmit current data through broadcasting.

In operation 1302, when a confirmation request signal SCAN_REQ corresponding to the broadcast data is not received from a user terminal, the sensor may determine that the data being currently transmitted are not transferred, and store the corresponding data in a separate storage. After that, the sensor may transmit subsequent data by switching a predetermined bit of the data to "1". For example, the sensor may transmit the data by switching a first digit of data field to "1" (while using remaining bits excluding the corresponding bit as valid data), thereby providing information regarding whether there are missing data. And the sensor may separately store the missing data in a storage each time data transmission fails.

In operation 1303, the user terminal may receive the data broadcast by the sensor when passing near the sensor and verify that the predetermined bit of the data is "1". When the predetermined bit of the data is "1", the user terminal may recognize that the sensor has missing data and transmit CONNECT_REQ to the corresponding sensor to set a connection to the sensor.

In operation 1304, when the user terminal is connected to the sensor, the user terminal may collect the missing data from the sensor and transmit the collected data to the server. And the connection may be terminated.

Figure 14:
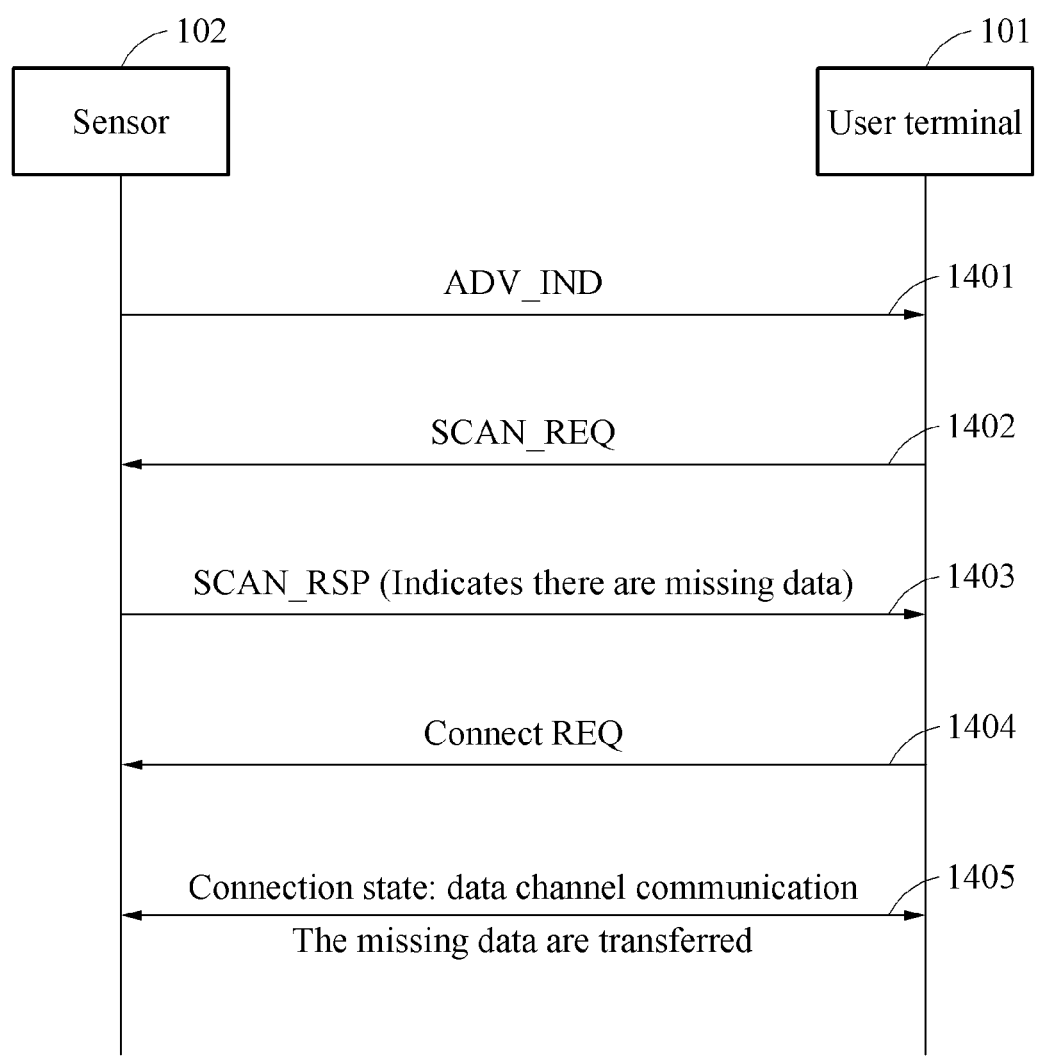
FIG. 14 is a flowchart illustrating a process of informing a user terminal of whether there are missing data using a payload of a confirmation response signal SCAN_RSP transmitted by a sensor in response to a confirmation request signal SCAN_REQ transmitted by the user terminal to the sensor according to an example embodiment.

FIG. 14 is a flowchart illustrating a process of informing a user terminal of whether there are missing data using a payload of a confirmation response signal SCAN_RSP transmitted by a sensor in response to a confirmation request signal SCAN_REQ transmitted by the user terminal to the sensor according to an example embodiment.

Referring to FIG. 14, a user terminal may receive information regarding whether there are data yet to be transmitted to the user terminal using a payload of a confirmation response signal SCAN_RSP transmitted from a sensor. In detail, the sensor may transmit the information regarding whether there are missing data to the user terminal using the confirmation response signal SCAN_RSP, rather than using a predetermined bit of data field.

Here, a confirmation request signal SCAN_REQ may be a signal to inform the sensor that the user terminal receives the data broadcast from the sensor. That is, the confirmation request signal SCAN_REQ may be a signal transmitted by the user terminal to the sensor.

The confirmation response signal SCAN_RSP may be a signal for the sensor to confirm that the sensor receives the confirmation request signal SCAN_REQ from the user terminal in response to the confirmation request signal SCAN_REQ of the user terminal. That is, the confirmation response signal SCAN_RSP may be a signal transmitted by the sensor to the user terminal. A process of collecting missing data may be performed as follows.

In operation 1401, a sensor may broadcast data. When a confirmation request signal SCAN_REQ is not received from a user terminal, the sensor may determine that the data being currently transmitted are not transferred, and store the corresponding data in a separate storage. And the sensor may accumulate and store corresponding data in the separate storage each time data transmission fails.

In operation 1402, when data broadcast from the sensor are received, the user terminal may transmit a confirmation request signal SCAN_REQ to the sensor to inform that the data are received.

In operation 1403, when the confirmation request signal SCAN_REQ is received from the user terminal, the sensor may indicate that there are missing data using a payload of a confirmation response signal SCAN_RSP and transmit the confirmation response signal SCAN_RSP to the user terminal. Here, a scheme of indicating a number of items of current missing data in the payload of the confirmation response signal SCAN_RSP and transmitting the confirmation response signal SCAN_RSP may be employed.

In operation 1404, if the user terminal finds that there are missing data from the payload of the confirmation response signal SCAN_RSP received from the sensor, the user terminal may transmit CONNECT_REQ to the sensor to request a connection thereto.

In operation 1405, when the sensor and the user terminal are connected, the user terminal may collect the missing data from the sensor and transmit the collected data to the server. And the connection may be terminated.

By using the two methods described above, a user terminal passing by in a different time slot may collect missing data and transmit the collected data to a server when there are data yet to be transmitted by a sensor.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data collection method, comprising:
by a user terminal,
generating an entry event indicating an entry into a valid region of a sensor by detecting a signal broadcast from the sensor;
collecting data from the sensor in response to the entry event; and
generating an exit event indicating an exit from the valid region of the sensor corresponding to the entry event, when a broadcast signal is not detected for a predetermined time,
wherein the entry event is used to run a predetermined application of a non-operational state in order to collect data of the sensor among all applications installed on the user terminal.

2. The data collection method of claim 1, wherein the generating of the entry event comprises generating the entry event to run a predetermined application configured to collect data of all sensors corresponding to a region of the sensor when entering the valid region of the sensor, among all applications installed on the user terminal.

3. The data collection method of claim 1, wherein the collecting comprises:
extracting at least one sensor corresponding to a data field set as a monitoring region of the user terminal based on a sensor scanning list of the user terminal; and
collecting data from the extracted at least one sensor.

4. The data collection method of claim 3, wherein the monitoring region of the user terminal includes a plurality of sections divided by predetermined ranges from a position of the user terminal,
wherein each of the plurality of sections is a section in which a sensor configured to measure at least one of environmental information, traffic information, human body information, or energy information is disposed to identify data collectable from the corresponding sensor.

5. The data collection method of claim 1, wherein the collecting comprises collecting the data from the sensor by setting an alternating region for a sensor disposed in a monitoring region of the user terminal based on a position of the user terminal.

6. The data collection method of claim 5, wherein the alternating region is a region in which a single sensor in a monitoring region list of the user terminal transmits data to the user terminal through a plurality of regions.

7. The data collection method of claim 5, wherein the collecting comprises continuously collecting data from a single sensor corresponding to a plurality of regions in the monitoring region of the user terminal, while repeating the entry event and the exit event.

8. The data collection method of claim 1, wherein the sensor is configured to measure environmental information, traffic information, human body information, or energy information at predetermined intervals and broadcast corresponding data to the user terminal for a predetermined period.

9. The data collection method of claim 1, further comprising:
transmitting, by the user terminal, a confirmation request signal of the data to the sensor such that the sensor checks a redundancy of the data, after the data are collected.

10. The data collection method of claim 9, wherein the sensor is configured to check the redundancy of the data transmitted to the user terminal using the confirmation request signal received from the user terminal based on unique identification information registered in advance between the user terminal and the sensor.

11. A user terminal, comprising:
a processor,
wherein the processor is configured to:
generate an entry event indicating an entry into a valid region of a sensor by detecting a signal broadcast from the sensor,
collect data from the sensor in response to the entry event, and
generate an exit event indicating an exit from the valid region of the sensor corresponding to the entry event, when a broadcast signal is not detected for a predetermined time,
wherein the entry event is used to run a predetermined application of a non-operational state in order to collect data of the sensor among all applications installed on the user terminal.

12. The user terminal of claim 11, wherein the processor is configured to generate the entry event to run a predetermined application configured to collect data of the sensor corresponding to the valid region, among all applications installed on the user terminal.

13. The user terminal of claim 11, wherein the processor is configured to extract at least one sensor corresponding to a data field set as a monitoring region of the user terminal based on a sensor scanning list of the user terminal, and collect data from the extracted at least one sensor.

14. The user terminal of claim 11, wherein the processor is configured to collect the data from the sensor by setting an alternating region for a sensor disposed in a monitoring region of the user terminal based on a position of the user terminal.

15. The user terminal of claim 14, wherein the processor is configured to continuously collect data from a single sensor having an alternating region in the monitoring region of the user terminal, while repeating the entry event and the exit event.

16. The user terminal of claim 11, wherein the processor is configured to transmit a confirmation request signal of the data to the sensor from which the data is received, such that the sensor checks a redundancy of the data, after the data are collected.

* * * * *